UNITED STATES PATENT OFFICE.

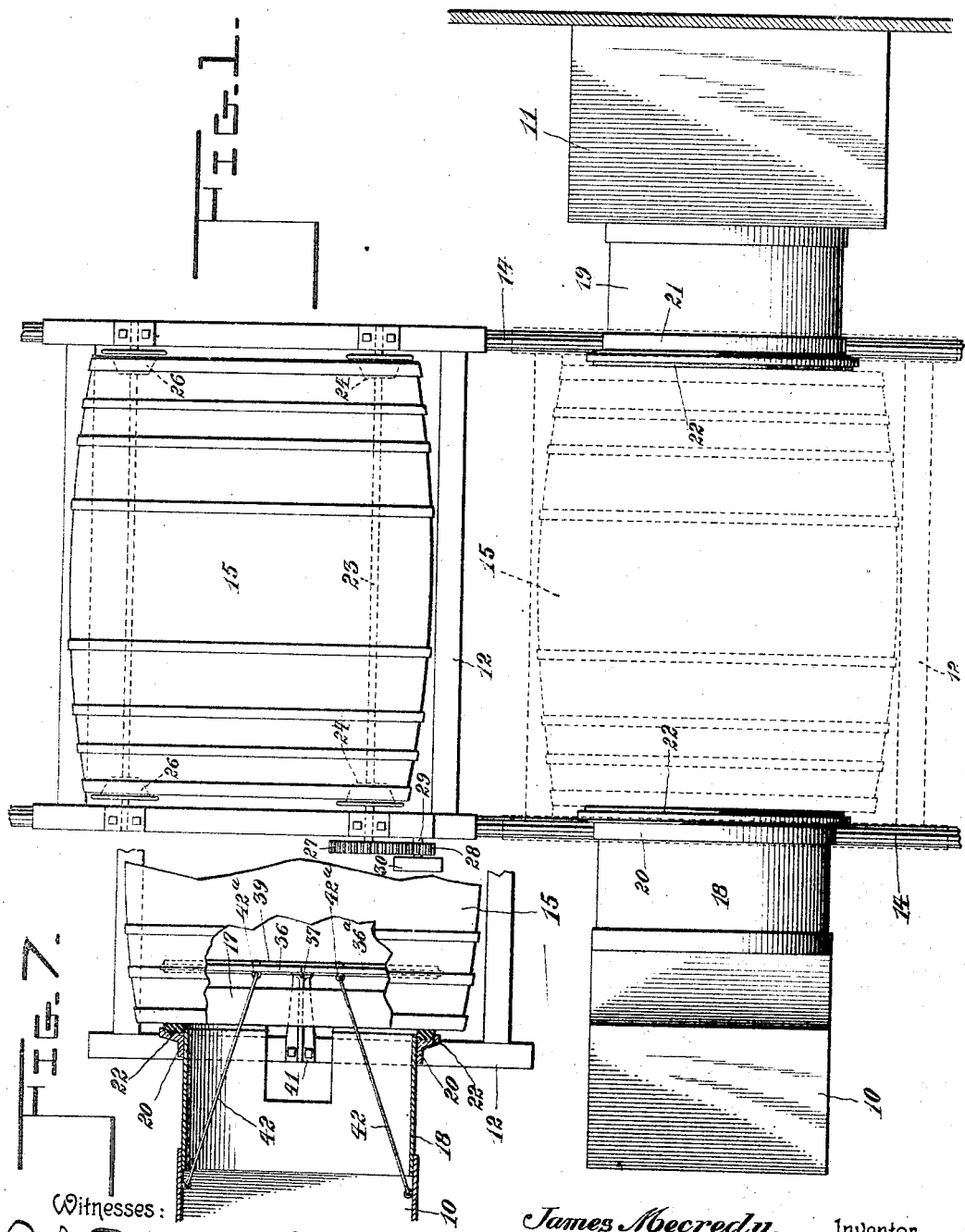

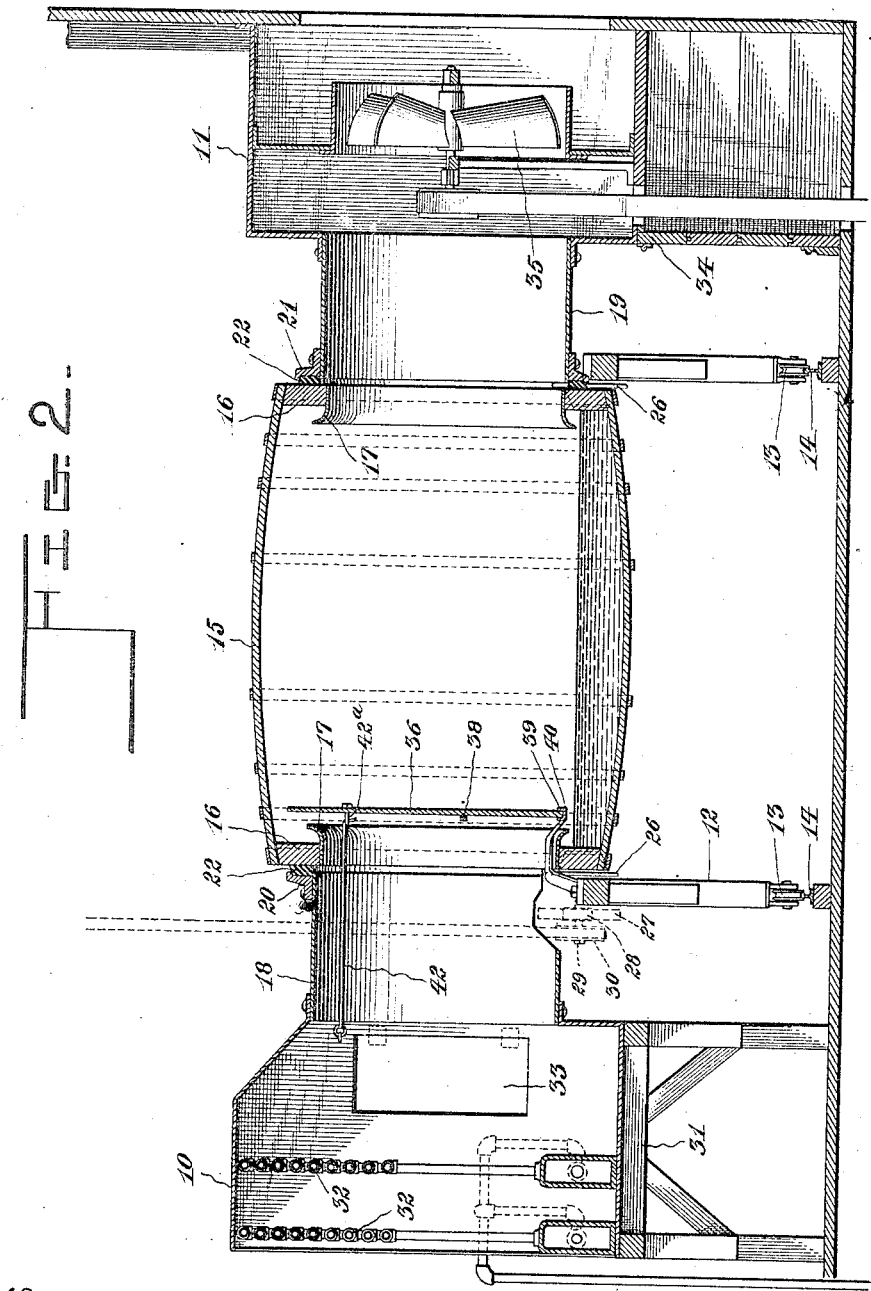

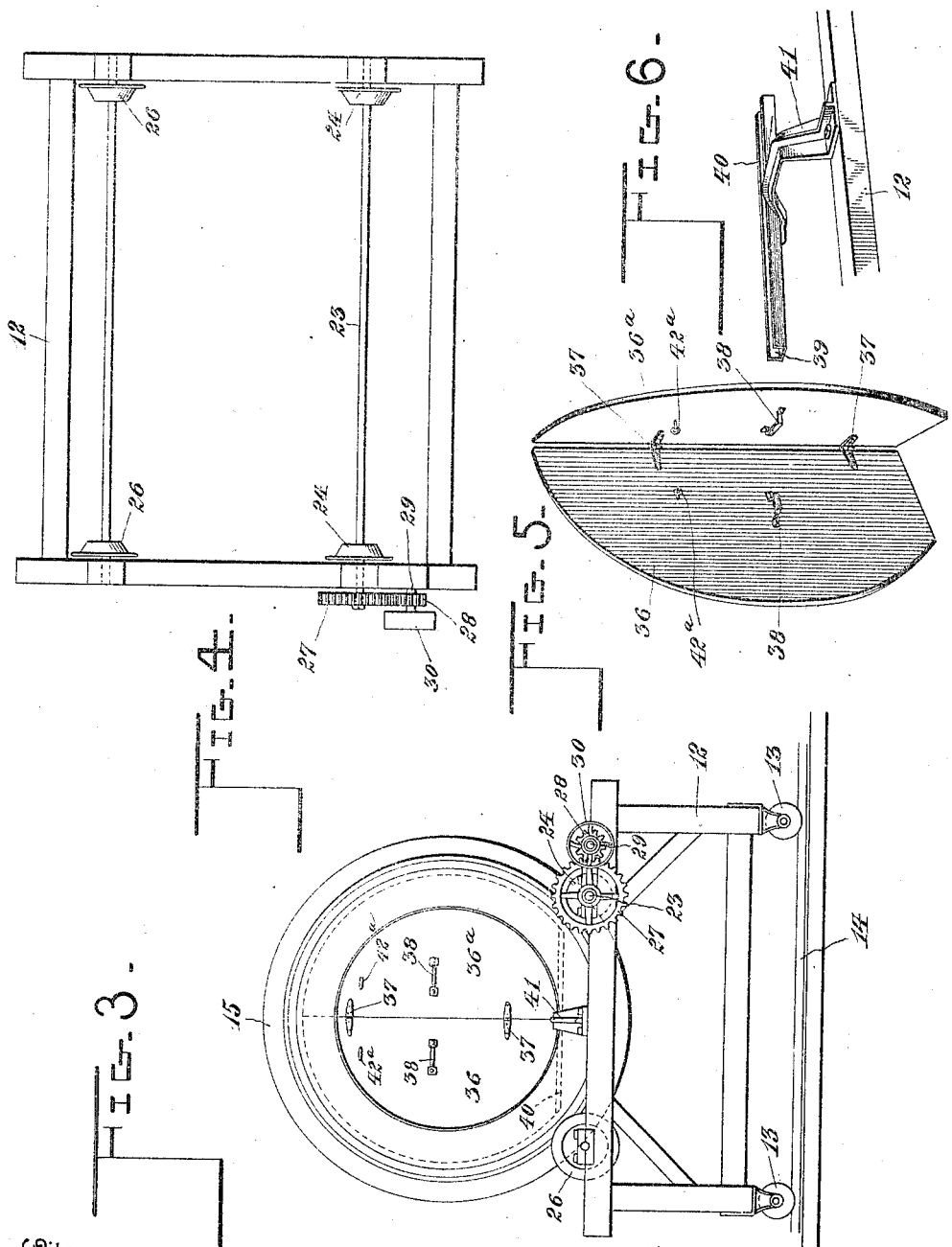

JAMES MECREDY, OF LONDON, ENGLAND.

EVAPORATING APPARATUS.

SPECIFICATION forming part of Letters Patent No. 692,465, dated February 4, 1902.

Application filed October 29, 1900. Serial No. 34,690. (No model.)

*To all whom it may concern:*

Be it known that I, JAMES MECREDY, a subject of Her Majesty the Queen of Great Britain, residing at London, England, have invented certain new and useful Improvements in Evaporating Apparatus; and I do hereby declare that the following is a full, clear, and exact description of the invention, such as will enable others skilled in the art to which it appertains to make and use the same.

My invention is an evaporating apparatus adapted for use as a means for desiccating eggs, as disclosed by prior Letters Patent granted to me, although it is to be understood that the apparatus may be used for treating other substances.

The present invention is an improvement on apparatus of that class which employ a revoluble vessel mounted to turn on a horizontal axis and equipped at each open end thereof with an inturned flange adapted to retain within the vessel the liquid or semiliquid substance, such as eggs, which is to be exposed to the desiccating effect of an air-current which circulates through the vessel. As heretofore constructed an apparatus of this class contemplated the use of an air-blast pipe having a flared exit in which is arranged a distributer-cone adapted to secure an annular air-space through which the air is forced, so as to flow through the revoluble vessel. Said vessel is also associated with heating devices in the form of burners arranged below the same, which requires the vessel to be made of metal. From practical experiments which I have made with machines of large capacity it is found that a vessel of truly cylindrical form is not well adapted to the needs of an apparatus of this character, because it will not contain a sufficiently large quantity of the substance to be treated; secondly, it is difficult to control the direction of the air-current flowing through the revoluble vessel when the air is forced or blown through the same, because the current has a tendency to flow in lines inclined to the plane of the inner surface of the vessel, owing to diminution in the strength of the current, and, thirdly, it is not practical in an apparatus of large capacity to heat the vessel by heat externally applied, because the vessel must be made of metal (which is very costly) and the factory becomes heated to a degree unbearable by the workmen.

One object of the present invention is to provide a novel vessel which is of increased capacity as compared with a cylindrical vessel and is adapted when in use to impart agitation to its semifluid contents in the direction of the vessel's length as well as in a lateral direction, due to the rotation of the vessel, whereby the substance is kept in motion to obviate settling thereof and effect a complete mechanical mixture.

A further object is to provide improved means for distributing the air-current within and through the vessel in a manner to insure the flow of air in a path approximately conforming to the shape of the vessel, thus exposing the film or coating on the inner surface of the vessel to the action of the air-current throughout the full area of the vessel.

Further objects are to provide means by which heated air may be supplied to the treatment vessel, to enable the treatment vessel to be cleansed and inspected with ease and despatch, and to promote the convenience of workmen in handling or manipulating the apparatus.

With these ends in view the invention consists in the novel combination of devices and in the construction and arrangement of parts, as will be hereinafter fully described and claimed.

In the drawings hereto annexed, forming part of this specification, Figure 1 is a plan view of my improved apparatus, illustrating the revoluble vessel shifted to a position at one side of an air-heater and an air-suction apparatus. Fig. 2 is a vertical longitudinal section through the apparatus, illustrating the revoluble vessel with the air-heater and a suction-fan. Fig. 3 is an end view of the shiftable carriage and the revoluble vessel mounted thereon, illustrating the position of the stationary distributer-plate within the revoluble vessel. Fig. 4 is a detail plan view of the shiftable carriage with the revoluble vessel removed. Fig. 5 is a detail perspective view of the air-distributer removed from the revoluble vessel. Fig. 6 is a detail perspective view of the support for the air-distributer. Fig. 7 is a detail plan view with parts broken away and in section, showing a portion of the vessel, the air-distributer, and the means for anchoring the latter in place.

The same numerals of reference denote like parts in each of the several figures of the drawings.

In carrying my invention into practice in the construction of an apparatus of large capacity I mount the revoluble treatment vessel on a carriage which is shiftable with respect to the casing 10 of an air-heater and the casing 11 of a suction-fan. The two casings 10 11 are erected on platforms which are spaced a suitable interval for the carriage to travel between the same, said casings being furthermore arranged in elevated positions and in line with each other, whereby the carriage may lie substantially in the plane of the platforms when it is adjusted between them to support the revoluble vessel in alined and operative relation to the air-heater and the suction-fan. Said vessel may be mounted in any approved way on a suitable construction of carriage, which is indicated by the numeral 12, said carriage being equipped with the rollers 13, adapted to travel on the rails constituting the track 14.

The revoluble vessel 15 is one of the important elements of my apparatus. Said vessel is circular in cross-section and tapers from the middle toward each end, thus giving a longitudinal curvature to the vessel and making it resemble the shape of a cask. Said vessel may be constructed of any material; but for economy in the construction of a vessel of large capacity and adapted to the use of desiccating eggs I prefer to build it up of staves, which are bound together by suitable hoops in a manner familiar to a cooper. Each end of this vessel is open in order that the air may be supplied to one end thereof by the air-heater and to permit the air to escape from the vessel, due to the energy developed by the suction-fan. To retain the liquid or semiliquid contents within the cask, the latter is formed, within the open ends thereof, with the flanges 16, which are bounded by the inturned gutters 17, said parts being made of any suitable material and the latter being arranged to catch the liquid as it drips from the interior surface of the vessel. The air-heater and the suction-fan casing occupy stationary positions with respect to the carriage; but the treatment vessel 15 is designed when in operative position to rotate on a horizontal axis and also to have its end portions engaged so closely with the air-heater and the suction-fan casing as to leave practically no spaces through which the air can leak to an appreciable degree. The close fitting of the revoluble vessel to the air-heater and the suction-fan casing may be obtained by a variety of constructions; but in the drawings I have represented very simple means, which have been found by practical experience to give satisfactory results. A short tube 18 is attached to the inner or opposing side of the air-heater casing, and a similar tube 19 is fastened to the corresponding side of the suction-fan casing. These two tubes support the coupling-rings 20 21, respectively, each coupling-ring being provided with a suitable packing 22. The vessel is mounted on the carriage by suitable devices which permit it to rotate on a horizontal longitudinal axis, and although various devices can be resorted to for sustaining the vessel in a position wherein it can be rotated from an overhead shaft I have shown one embodiment of means for attaining this end. A driving-shaft 23 is arranged longitudinally of the carriage and mounted in suitable bearing thereon close to the under side of the vessel, said shaft being equipped with the rolls 24, that engage directly with said vessel at one side of the center thereof. The idle rolls 26 engage with the opposite side of the vessel near the ends thereof, whereby the vessel rests upon the rolls 24 26. The shaft 23 is equipped with a gear-wheel 27, that has intermeshing engagement with a gear-pinion 28, the latter being secured on a power-shaft 29, which is journaled on the carriage-frame. Said shaft is also equipped with a pulley 30, over which may be placed a belt leading from a cone-pulley on a line-shaft, (not shown,) said cone-pulley adapted to drive the belt at a rate of speed which may be required for the proper operation of the vessel.

The air-heater casing 10 is arranged on an elevated platform 31, said casing being equipped with a series of multiple coils 32, which are spaced a proper distance apart and are arranged for the air to circulate freely therethrough. The casing is also provided at one side with a door 33, adapted to be opened for an attendant to pass into the casing and adjust the anchors or stays for the air-distributer plate to be hereinafter described. I would have it understood that I do not restrict myself to the particular type of air-heater herein shown and described.

The casing 11 of the suction-fan is on a platform 34, which is preferably in the same horizontal plane as the platform 31, and in this fan-casing is mounted the shaft of a suction-fan 35.

The air-distributer which I employ in my apparatus resembles a disk or plate, which is supported in a stationary position within the revoluble vessel near the end that is coupled to the air-heater, said distributer plate or disk being arranged free from contact with the heater vessel, so as to form an annular space between the edge of the disk and the inner surface of the vessel. This distributer-plate is in two sections or members 36 36ª, which are hinged together at 37 and are provided with handles 38. The hinged construction of said plate enables the members to be folded or closed by the attendant whenever it is desired to insert the distributer into the vessel or to remove it from the same. The distributer subsequent to its insertion into the intake end of the vessel is opened for the members to occupy alined relation and to fit in a groove 39 of a seat-rail 40, said seat-rail being fast with a bracket 41, which is secured to the framework of the carriage in a manner to extend into the vessel and clear the flange and gutters 16 17, respectively, at said intake end of the vessel. The members of this distributer-plate snugly fill the groove in the seat-rail, so as to be sustained thereby in an upright position within the intake end of the revoluble vessel, and to prevent the distributer-plate from falling inward under the pressure of the inflowing current of air created by the rotation of the suction-fan I employ the anchors 42, which may be connected to the eyes 42$^a$ and attached to suitable fasteners arranged within the chamber of the air-heater casing 10, access to which may be attained through the door 33. The diameter of the distributer plate or disk is less than the external diameter of the cask at the intake end, said plate or disk lying within the flange 16 and the gutter, so as to leave a clear space between its edge and the inner surfaces of the cask, through which space the air is free to flow. It will be understood that the air-heater occupies an operative relation to one end of the revoluble vessel, whereas the suction-fan is disposed in like relation to the other end of said vessel, whereby the suction-fan when in motion creates a suction-current through the air-heater and the revoluble vessel, the air being heated to the proper temperature by contact of the coils with the heater. The distributer-plate deflects the current of air toward the inner surfaces of the vessel, said air-current moving in a path corresponding to the inner surface of the vessel and close to the latter throughout the length thereof. This desirable end is secured by the employment of a suction-fan at one end of the vessel and the distributer-plate at or near the other end of said vessel, although two or more plates within the revoluble vessel may be employed.

In operation the carriage is shifted toward one end of the track to make the vessel lie at one side of the alined heater and fan. This is advantageous, because an operator can easily obtain access to the interior of the vessel for the purpose of cleansing the same and also because the treated substance may readily be discharged from the vessel and a fresh supply of the substance may be introduced thereinto. After the vessel shall have been charged with the desired quantity of the substance to be treated the carriage is moved back to position between the platforms, and the ends of the vessel are engaged with the packed coupling-rings and the heater and the suction-fan, respectively. The belt is now fitted on the pulley 30 to drive the shaft 23 and rotate the vessel, and at the same time the suction-fan is started in motion to establish the desired suction-current through the heater and the rotary vessel, the exhausted hot air being blown directly out of the factory. The longitudinal curvature of the vessel and the rotation of the vessel on its longitudinal axis have been found to secure a peculiar and beneficial effect on the semiliquid substance under treatment, because a thin film of the substance is caused to travel upwardly with the ascending surface of the vessel, and the surplus substance which is not dried by the air flows back into the mass at the bottom, which backward-flowing liquid is made to circulate or travel by the longitudinal curvature of the vessel and by the gravity of the liquid itself in a direction from the end portions toward the middle of said vessel, at the bottom thereof. By this peculiar action of the semiliquid substance under treatment, which is due to the shape and to the motion of the vessel, it is kept in a state of agitation, which secures the homogeneous admixture of the elements of fresh eggs, which admixture is essential in the desiccation of this particular food product. The agitation of the semiliquid mass prevents settling of the constituent parts of the eggs, keeps the latter in a condition proper for action thereon by the air-current for quite a long time without any attention on the part of the operator, and exposes a large area of the thin film of mixed eggs throughout the whole interior of the vessel. After the operation has proceeded for a proper length of time—say two or three hours—the suction-fan is arrested and the belt slipped off the pulley 30, after which the shiftable carriage and the vessel are moved to one side, so as to bring the vessel out of alinement with the heater and the fan, thereby exposing the ends of the vessel. As heretofore indicated, the treated contents may be drawn off from the vessel, the latter may be washed or otherwise cleansed, and a fresh supply of the substance to be treated may be induced into the vessel before moving the carriage back to its operative position.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

The homogeneous character of the liquid under treatment is secured partly by the uneven motion of a vessel of the character set forth, which imparts a rocking motion to the fluid, and partly to the rotating motion secured by the rotation of the vessel or cylinder.

Having thus described my invention, what I claim as new is—

1. In an apparatus for evaporating or desiccating eggs, a treatment vessel having its active interior surface substantially unbroken and curved in the direction of its length, and inturned gutters within the ends of said vessel and defining the limits of the active curved surface thereof, combined with means for rotating the vessel on its axis, whereby a film will be formed throughout the active surface of said vessel and the return movement of the surplusage of material will be downward and toward the center, thereby forming an admixture of the bulk contents due to the curvature of the vessel, and means for producing a circulation of air through said vessel, substantially as and for the purposes set forth.

2. In an apparatus for evaporating or desiccating eggs, a treatment vessel the interior of which is substantially unbroken and unobstructed throughout its active surface, said active surface being curved continuously in the direction of its length and of circular cross-sectional contour, and inturned gutters defining the limits of said curved active area or surface of the vessel, combined with means for rotating the vessel, whereby a film will be formed throughout the active surface of said vessel and the return movement of the surplusage of material will be downward and toward the center, thereby forming an admixture of the bulk contents due to the curvature of the vessel, and means for circulating air through the vessel and in paths closely following the contour of the active surface of said vessel, substantially as described.

3. In an evaporating apparatus, the combination of an air-heater; a suction device; a revoluble vessel interposed between and having detachable and operative engagement at its end portions with the air-heater and the suction device; and a wheeled carriage supporting said revoluble vessel and adapted to bodily shift the same transversely with respect to the air-heater and suction device, whereby the vessel may be displaced from its operative position and the end portions thereof exposed to convenient access, as set forth.

4. In an evaporating apparatus, the combination of a revoluble vessel; a shiftable carriage on which said vessel is revolubly mounted; and means for inducing a heated current of air therethrough, the inducing means being located at the discharge end of the vessel, said carriage being movable transversely of the direction of the air-current; and means for rotating the vessel when in its operative relation to the air-inducing mechanism, substantially as and for the purposes described.

5. In an evaporating apparatus, the combination with a vessel, of means for inducing a suction-current therethrough, and a foldable distributer-plate removably supported within the vessel and arranged for the edges thereof to terminate close to the inner surface of the vessel and thereby form a restricted annular space or opening, substantially as described.

6. In an evaporating apparatus, the combination with an air-heater, and a suction device, of a revoluble vessel situated between the heater and the suction device, a foldable sectional distributer-plate within said vessel adjacent to the air-heater, and means for holding said plate in a stationary position, free from engagement with the revoluble vessel, and for locking the sections of said plate in their operative positions, substantially as described.

7. In an evaporating apparatus, the combination of an air-heater, a suction device, a shiftable carriage mounted for transverse movement between the air-heater and said suction device and a revoluble vessel on the carriage, said vessel being shiftable with the carriage into and out of alined relation to the air-heater and the suction device, substantially as described.

8. In an evaporating apparatus, the combination of a shiftable carriage, a revoluble vessel thereon, a distributer-plate, and means attached to the carriage for supporting said plate within said vessel, substantially as described.

9. In an evaporating apparatus, an air-distributer consisting of a foldable sectional plate having its members hinged together, combined with a revoluble vessel, and means for sustaining said foldable plate in an operative stationary position relative to said vessel, substantially as described.

10. In an evaporating apparatus, the combination of a carriage, a revoluble vessel thereon, a support attached to the carriage and extending into the vessel, a grooved seat-rail on the support, and a distributer-plate fitted to the groove of said seat-rail and mounted within an open end portion of the vessel, substantially as described.

In witness whereof I have hereunto set my hand in the presence of two witnesses.

JAMES MECREDY.

Witnesses:
H. T. BERNHARD,
J. F. DEUFFERWIEL.